No. 643,301. Patented Feb. 13, 1900.
C. C. LONGRIDGE & G. T. HOLLOWAY.
PROCESS OF SMELTING AURIFEROUS ANTIMONY ORES.
(Application filed Aug. 15, 1896.)

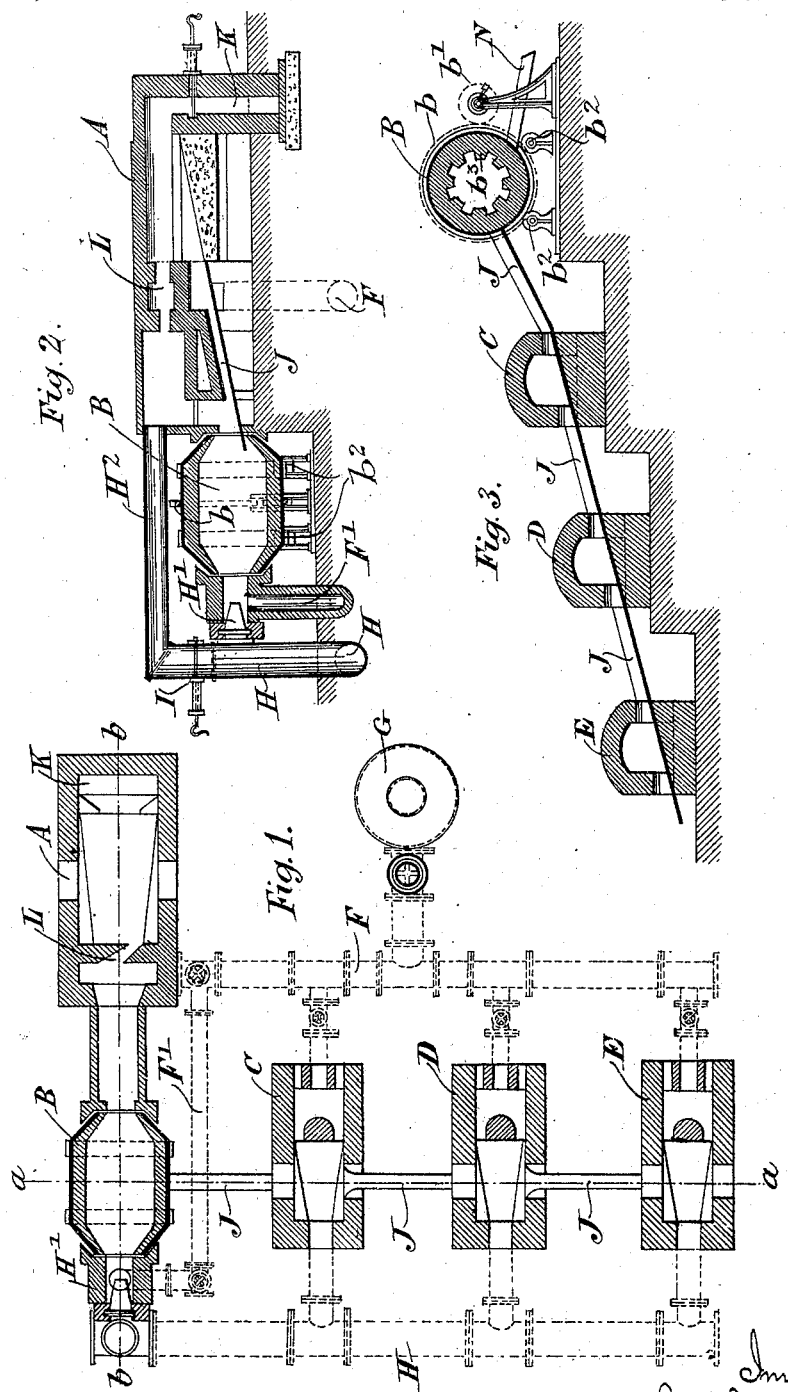

(No Model.) 2 Sheets—Sheet 2.

UNITED STATES PATENT OFFICE.

CECIL CLEMENT LONGRIDGE, OF LEIGH, AND GEORGE THOMAS HOLLOWAY, OF LONDON, ENGLAND.

PROCESS OF SMELTING AURIFEROUS ANTIMONY ORES.

SPECIFICATION forming part of Letters Patent No. 643,301, dated February 13, 1900.

Application filed August 15, 1896. Serial No. 602,902. (No specimens.)

*To all whom it may concern:*

Be it known that we, CECIL CLEMENT LONGRIDGE, consulting and mining engineer, residing at Leigh, in the county of Essex, and GEORGE THOMAS HOLLOWAY, analytical and consulting chemist, residing at 57 Chancery Lane, London, in the county of Middlesex, England, citizens of Great Britain, have invented certain new and useful Improvements in Plants and Processes for Smelting Auriferous Antimony Ores, of which the following is a specification.

Our invention relates to an improved process of smelting antimony ores whereby also gold, if present, can be extracted, and for this purpose we employ a continuous system of furnaces or chambers, preferably gas-fired, whereby a constant temperature and a reducing atmosphere can be better maintained.

Figure 4:
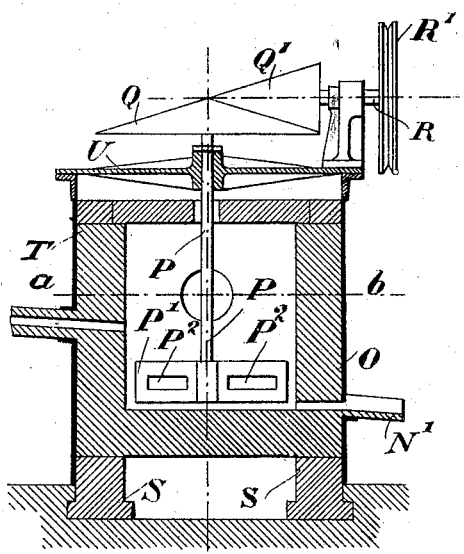
Figure 5:
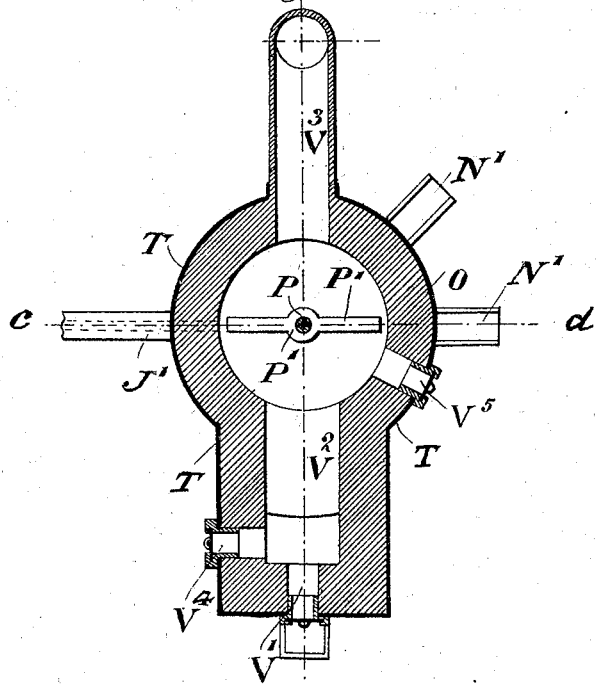

In the accompanying drawings, Figure 1 is a plan of the general arrangement of furnaces or chambers so employed, while Figs. 2 and 3 are respectively sections on the lines $bb$ and $aa$, Fig. 1. Fig. 4 is a sectional elevation on lines C D of Fig. 5; Fig. 5, a sectional plan on line A B of Fig. 4 of an alternative mixing-furnace.

The general arrangement as illustrated consists of a liquating-furnace A, a reducing-furnace C, a refining-furnace D, and a starring-furnace E or furnace in which crude metallic antimony is purified from sulfur and other impurities; but refining and starring, if desired, may be conducted in the same furnaces. When it is desired to extract gold from the ore, a mixing or gold-extracting furnace B is interposed between the liquating furnace A and the reducing-furnace C and in this the gold is extracted from the liquated sulfid by the method hereinafter described. The furnaces are in communication with flues for the passage of the furnace-gases, so that the same can at will be led through each furnace independently before entering the condensing flue or stack or conducted successively throughout the series and so effect economy of heat, and the furnaces may likewise be provided with by-pass valves and flues, so that the combustion-gases can be led around any furnace or furnaces when repairs are required or the nature of the operation conducted renders it advisable.

For the better regulation of the temperature and for independent working the furnaces are fitted with direct auxiliary gas-supply. The furnaces are supplied with the necessary tapping-holes and covered conduits or launders J for leading the metal from one furnace to the other, as also stirring and sight-holes, ore-chutes, doors, &c.

In the actual arrangement illustrated in the drawings it will be seen that the reducing, refining, and starring furnaces C, D, and E are independently fired from the gas-supply main F and that provision is made for direct firing of the mixing chamber or furnace B in a branch F' from the main supply-pipe F; but the mixing chamber or furnace B may be kept at normal temperature by means of the waste gases from the other furnaces C D E, conducted through flues H and nozzle H'. In the alternative, however, such waste products may be conducted through a by-pass $H^2$ to the liquating-furnace A, a suitable valve I being provided for regulation as required. The liquating furnace or chamber A may also be fired or kept at normal temperature by the waste gases passing through the by-pass $H^2$ or, in the alternative, may be fired direct with gas from the main supply-pipe F. A suitable valve is provided for regulation while the gas is admitted into the furnace at L and passes through the flue K to the chimney-stack. A conduit or launder J is provided for the purpose of conveying the liquated sulfid or other ore to the mixing-chamber, as illustrated. The antimony sulfid is first reduced to crude metallic antimony by "singling" in the furnace C—that is, by fusion—with metallic iron, whereby iron sulfid and metallic antimony are produced. This crude metal is then passed by means of a launder J' to the next furnace D for doubling or refining by fusion with liquated antimony sulfid and common salt, whereby the metal is to a great extent freed from iron. This partly-refined metal is next treated by fusion in the next starring-furnace E, to which it is passed through the launder J, with a flux commonly used by antimony-smelters under the name of "antimony flux."

The starring is a process of purification from sulfur as well as from iron. A launder N is provided for conveying the gold-laden antimony from the mixing-chamber B when such has become sufficiently enriched with gold.

To favor the flow of metal, the furnaces are built on an incline or series of steps, as illustrated in Fig. 3, the liquating-furnace A being at the top and the starring-furnace E at the bottom of the series.

The gases of combustion may be made to flow upward, as illustrated, or downward through the series, according to the position of the stack.

The gold-extracting furnace B is so constructed as to insure complete and continuous mixing of the sulfid with the metallic antimony. We therefore employ for this purpose either a rotary or an agitating furnace or a fixed furnace with a mechanical mixer, a convenient form of the latter being a vertical revolving spindle driven by cog, worm, friction, or belt gearing and carrying a fire-clay stirrer with or without a metal foundation, the same being protected from the action of the sulfid. The stirrer may be shaped like the blade of a screw-propeller.

A rotary furnace B is illustrated in the drawings, which is driven by means of gearing $b$ $b'$ capable of being operated by manual power, and the furnace rotates upon rollers $b^2$ $b^2$ and is provided with an interior lining of refractory material and a series of ribs $b^3$.

A fixed furnace O is illustrated in the drawings, Figs. 4 and 5, which is built of fire-brick upon a foundation S and within a metal encasement T. A stirrer P' operates within the furnace O and is mounted at the extremity of a vertically-disposed rotating shaft P, which is held in position within a bearing upon the top plate U, which is fixed upon the top of the furnace O. The shaft P is caused to rotate by means of beveled gearing Q Q', motion being derived from the shaft R and pulley R', mounted thereupon, motion being communicated to pulley R' by means of a rope or belt. The stirrer P' is covered with fire-clay and is provided with holes P² within each of its blades to augment the intimate admixture and to facilitate rotation. The liquated ore passes from the liquating-furnaces through a launder J' into the extracting-furnace O, while fused metallic antimony is added through the charging-door V⁵ and rotation of the stirrer P' is effected, the gas passing up from the conduit V and meeting with a supply of air through the air-admission aperture V', igniting in the chamber V² and passing to the interior of the furnace O and in contact with the ore and antimony, and thence passing through the conduit V³ away. V⁴, Fig. 5, shows a lighting and sight hole, while N' are launders along which the gold carrying antimony is withdrawn.

We do not limit ourselves to the use of the gold-extracting furnace in connection with the series of furnaces for the reduction of antimony, but may use the extracting-furnace alone if it is desired to extract the gold and reduce the sulfid elsewhere, or we can use such series without the extracting-furnace if the gold is not to be extracted.

The furnaces are preferably built to work with producer-gas from a producer or plant G, as supplied by the several systems now in use.

Our method of extracting gold from antimony ores and other auriferous products when gold is present in a free state and in this form soluble in antimony or sulfid of antimony is as follows:

First. The liquated sulfid or other ore of antimony carrying gold freed from gangue if present to any notable extent is agitated in any suitable furnace or receptacle with metallic antimony, which by reason of the greater affinity of the metallic antimony for the metallic gold than sulfid of antimony extracts the gold present in the ore.

Second. The liquated sulfid or other ore of antimony carrying gold is treated with sufficient metallic iron capable of reducing antimony therefrom, so as to reduce sufficient antimony to extract and retain the gold. The reducing action of the iron may be expressed by the equation $$Sb_2S_3 + 3Fe = Sb_2 + 3FeS.$$

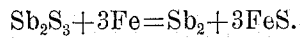

Third. By a combination of the first and second methods the proportion of antimony used for the gold extraction need only form a small proportion of the sulfid treated; but we preferably employ a quantity equal to fifty per cent. or more of the sulfid treated. The metallic antimony and the sulfid or other ore are intimately and continuously mixed by mechanical stirring until the extraction is judged to be complete. The metallic antimony employed is used with successive charges of ore until it is found sufficiently enriched with gold, when it is withdrawn from the furnace. The antimony when enriched with gold is heated in one of the furnaces C, D, or E in the presence of an oxidizing atmosphere or in an excess of air, so that the antimony is converted into oxid ($Sb_2O_2$) according to the following equation:

$$2Sb_2 + 2O_3 = 2Sb_2O_3.$$

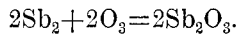

The antimony oxid passes off as vapor and may be condensed in the flues or elsewhere, and the gold is left behind in the metallic state. Well known electrolytic or economical process may be utilized, however, for the recovery of the gold. It does not appear advisable to enrich the antimony to more than one hundred ounces of gold to the ton.

In describing the methods which we preferably employ for treating auriferous antimony ores we will refer to the ore known as "antimonite" and consisting of the sulfid of antimony carrying free gold, as that is the most common ore of antimony.

In the case of the first method the ore is liquated and the sulfid is run into the mixing or gold-extracting furnace or chamber B, where it is intimately and continuously mixed, as before described, with the metallic antimony, so that the antimony shall come in contact with the maximum amount of the sulfid. When the extraction is judged complete, the sulfid is removed from the furnace or chamber and a fresh charge may be treated.

In treating very rich ores with little or no gangue the liquation might be conducted in the extracting furnace or chamber, if desired.

When treating antimonite by the second method, the liquated sulfid is acted upon by sufficient metallic iron or other suitable reducing agent to reduce sufficient antimony to combine with the bulk of the gold, and a system of mixing or agitating is adopted, as in the case of the first method.

As ordinary antimonite will dissolve a proportion of the metallic antimony in the extracting-furnace, and thus reduce the bath, the loss may be made good by a combination of the first and second methods or by introducing fresh antimony, as required.

In treating auriferous substances other than ores of antimony we first treat the same with fused liquated sulfid of antimony, in which metallic gold is readily soluble, and having thus concentrated the gold in the antimony sulfid we treat the latter as already described to extract the gold from it. Owing to the small quantity of gold present in auriferous antimony, which averages three and one-half ounces of gold per ton of ore, and therefore only about one-hundredth of one per cent., it has never been found possible to find out exactly the state in which it exists. Sometimes it is in the visible metallic state; but in many cases it is probably in the form of a double sulfid of antimony and gold. It is impossible, therefore, to express the changes which occur during the extraction of the gold by equations. The result is merely an alloy of gold and antimony, the ore being unaffected except that its contained gold has been removed. It is not perhaps right to say that metallic antimony has a greater affinity for metallic gold than sulfur. What is the case is that the metallic antimony has a greater affinity for metallic gold than sulfid of antimony—that is, the ore—and any other supposition is unwarrantable. No doubt when antimony is added to the fused sulfid the gold would be liberated and dissolved in the excess of antimony, the sulfur liberated from the gold combining with its equivalent of antimony; but we have no reason for thinking that the gold is present as sulfid of gold. The simplest way of regarding the matter is to consider the gold as simply dissolved, as salt dissolves in water.

Having thus described our invention, what we claim as new, and desire to secure by Letters Patent, is—

A process for the extraction of gold from auriferous antimony sulfid ores consisting in the fusion of metallic antimony with ore and in the addition of sufficient metallic iron to the fused ore to convert enough antimony sulfid to metallic antimony to make good the loss of metallic antimony due to the solvent action of the sulfid ore and in the intimate admixture of the metallic antimony and sulfid of antimony by mechanical means, so as to effect the extraction of the gold by virtue of the greater affinity of the metallic antimony than the antimony sulfid for gold and by the greater density of the antimony gold alloy produced, substantially as hereinbefore described.

In witness whereof we have hereunto set our hands in presence of two witnesses.

CECIL CLEMENT LONGRIDGE.
GEORGE THOMAS HOLLOWAY.

Witnesses:
WILLIAM EVANS,
WILLIAM HALL.